United States Patent
Maitlen

(10) Patent No.: US 7,813,890 B2
(45) Date of Patent: Oct. 12, 2010

(54) SYSTEM AND METHOD FOR DETECTION OF STOPPED VEHICLE

(75) Inventor: Daniel S. Maitlen, Farmington Hills, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 466 days.

(21) Appl. No.: 11/868,797

(22) Filed: Oct. 8, 2007

(65) Prior Publication Data

US 2009/0093993 A1 Apr. 9, 2009

(51) Int. Cl.
*G01P 3/00* (2006.01)
(52) U.S. Cl. ...................................... 702/142
(58) Field of Classification Search .................. 702/142
See application file for complete search history.

(56) References Cited

U.S. PATENT DOCUMENTS 4,270,176 A * 5/1981 Skarvada ..................... 702/148
2003/0100979 A1* 5/2003 Lu et al. ........................ 701/36

* cited by examiner

*Primary Examiner*—Tung S Lau
(74) *Attorney, Agent, or Firm*—Ingrassia Fisher & Lorenz, P.C.

(57) ABSTRACT

A system, method and computer program product is provided for detecting if a vehicle is stopped. A wheel speed, transmission output speed, and a vehicle state, representative of a plurality of vehicle dynamic parameters, is determined. The vehicle is determined to be stopped if, after a predetermined period of time, the wheel speed and transmission output speed remain zero and the vehicle state remains stable.

9 Claims, 2 Drawing Sheets

SYSTEM AND METHOD FOR DETECTION OF STOPPED VEHICLE

TECHNICAL FIELD

The present invention generally relates to automotive control systems, and more particularly relates to a method and a system for detection of a stopped vehicle.

BACKGROUND OF THE INVENTION

Dynamics control systems are increasingly used in automotive vehicles to improve vehicle safety and satisfy government regulations. Examples of such systems include vehicle active safety systems such as vehicle electronic stability control (ESC) systems, comprehensive safety vehicle (CSV) systems, and vehicle lane change assist systems. For those safety systems to operate effectively, accurate and timely knowledge of vehicle dynamic states are required.

Vehicle dynamic states such as lateral acceleration, longitudinal acceleration, and yaw rate are utilized by vehicle state sensors in vehicle dynamics control systems to perform control operations. Improper installation or lifespan degradation of such state sensors may result in errors or offsets. This offset must be compensated for to insure the accuracy of the sensors. To insure no dynamic events are included, sensor compensation must only occur when the vehicle is at rest. Thus, the detection of the vehicle's resting state is necessary to insure proper sensor compensation.

One method for detecting the resting state of a vehicle requires all wheel speeds of the vehicle to become near zero. As a result, a single noisy wheel speed sensor in such a system would prevent the detection of a vehicle at rest. In addition, a vehicle might be detected at rest when, in fact, it was sliding on a slick surface with all four wheels locked. Accordingly, the need exists for a more robust system and method for detecting the resting state of a vehicle. In addition, it is desirable to implement such a system and method using the commonly available sensors previously described. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, by way of example only, a method is provided for determining if a vehicle is stopped. The method comprises determining a wheel speed, transmission output speed and a vehicle state representative of a plurality of vehicle dynamic parameters, and determining that a vehicle is stopped if, after a predetermined period of time, the wheel speed and transmission output speed remain zero and the vehicle state remains stable.

In another embodiment, again by way of example only, a system is provided for determining if a vehicle is stopped. A processor has a plurality of sensors configured to receive a plurality of dynamic parameters of the vehicle. The processor is configured to register a wheel speed, transmission output speed and the vehicle states representative of the plurality of dynamic parameters, and determine that a vehicle is stopped if, after a predetermined period of time, the wheel speed and transmission output speed remain zero and the vehicle state remains stable.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description and claimed subject matter presents a novel system and method for determining when a vehicle is at rest. The method improves upon relying solely upon wheel speeds to determine if a vehicle is stopped by examining, in a series of steps, various operational parameters of the vehicle in combination with wheel speeds and transmission speed measurements. If each of these parameters, examined in total, indicate that the vehicle is stopped, then a more accurate determination may be made that the vehicle is, indeed, stopped.

The method can be organized into three different stages. In the first stage, a determination is made that the speed of the wheels are near zero. The wheel speeds may be checked with respect to a predetermined threshold. When a predetermined number of wheel speeds are less than this threshold, the wheels are confirmed to be stopped.

In the second stage of the method, because the transmission output shaft sensor of the vehicle has greater resolution than the wheel speed sensors, a further check of the transmission output sensor may be made against a threshold. When the transmission output shaft speed is less than this threshold, the wheels are reconfirmed to be stopped.

In the third stage, an identical analysis may be applied to the vehicle lateral acceleration, longitudinal acceleration, and the rate of change of the yaw rate to determine if their values have become substantially level. In one embodiment, this may be accomplished by periodically sampling each signal at a geometric progression of repeating prime numbers and taking their rolling average. When the absolute value of the difference between this average value and the current value is less then a small threshold, the signal is determined to be level and stable.

Additional checks may be employed to determine if the wheels, transmission, and vehicle states have stopped and become stable respectively. These additional checks will be further described below. When it has been determined that the wheels, transmission, and vehicle states have stopped for a significant period of time, the vehicle may then be determined to be at rest.

Figure 1:
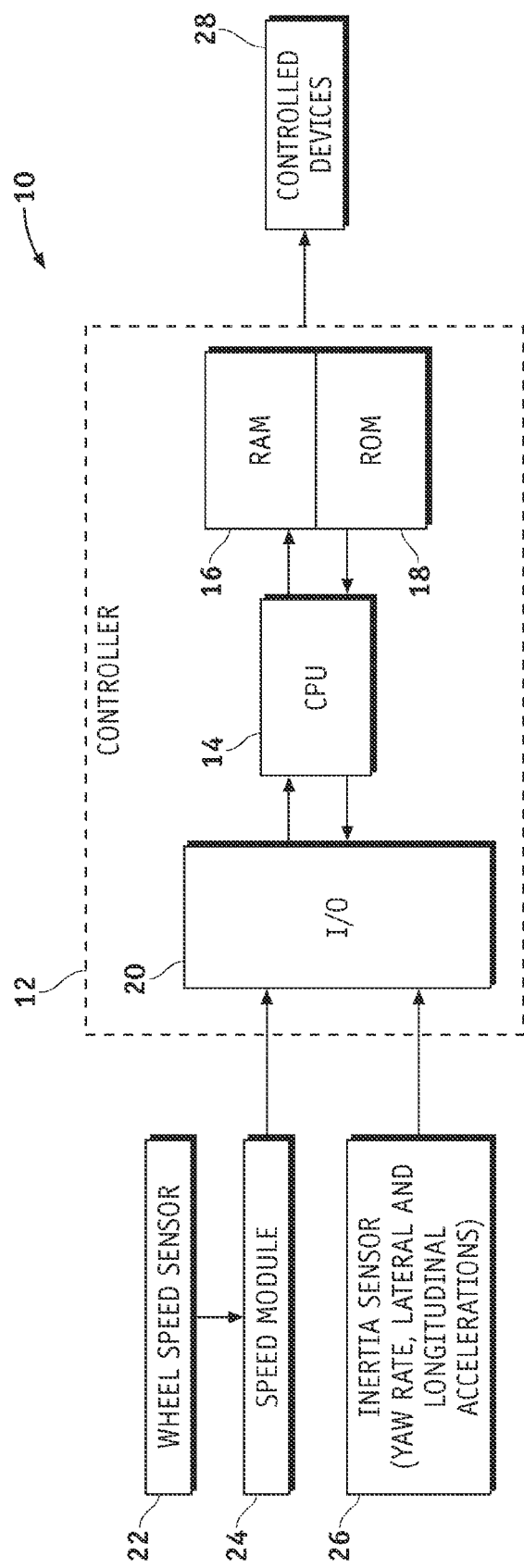
FIG. 1 is a block diagram of an exemplary embodiment of a system for detecting a when a vehicle is at rest.

FIG. 1 is a block diagram of an exemplary hardware system that may be used detect when a vehicle is at rest. A processor/controller device 12 includes a central processing unit (CPU) 14 coupled to a memory device 16, such as random access memory (RAM), non-volatile read only memory (NVROM), and possibly other mass storage devices 18. CPU 14 is coupled through an input/output (I/O) interface 20 to one of a plurality of sensors that provide operational data from a vehicle, such as vehicle speed, to the CPU 14. These sensors may include an inertia sensor cluster 26 which provides signals representative of yaw rate, lateral acceleration, and longitudinal acceleration.

Wheel speed sensors 22 provide signals representative of speed to speed module 24. Alternatively, wheel speed may be calculated internally based on available sensor signals. As will be appreciated, system 10 may include a variety of additional components, such as additional sensors associated with module 24 that are configured in an array or additional memory or processing components for a particular application. Additionally, system 10 as depicted may comprise a portion of a larger overall processing component of a vehicle. System 10 may be coupled to a power source (not shown) of the vehicle, such as a 12V battery. An output of system 10 is coupled to at least one controlled device 28 such as an actuator or a motor. For example, controlled device 28 can be a subcomponent of the aforementioned ESC system.

CPU 14 may be configured to execute computer instructions which may be stored in memory 16, mass storage device 18, or embodied in a computer program product such as a digital versatile disk (DVD) or compact disk (CD) or an equivalent. The computer instructions may include executable commands which incorporate methodologies and algorithms as further described below.

Figure 2:
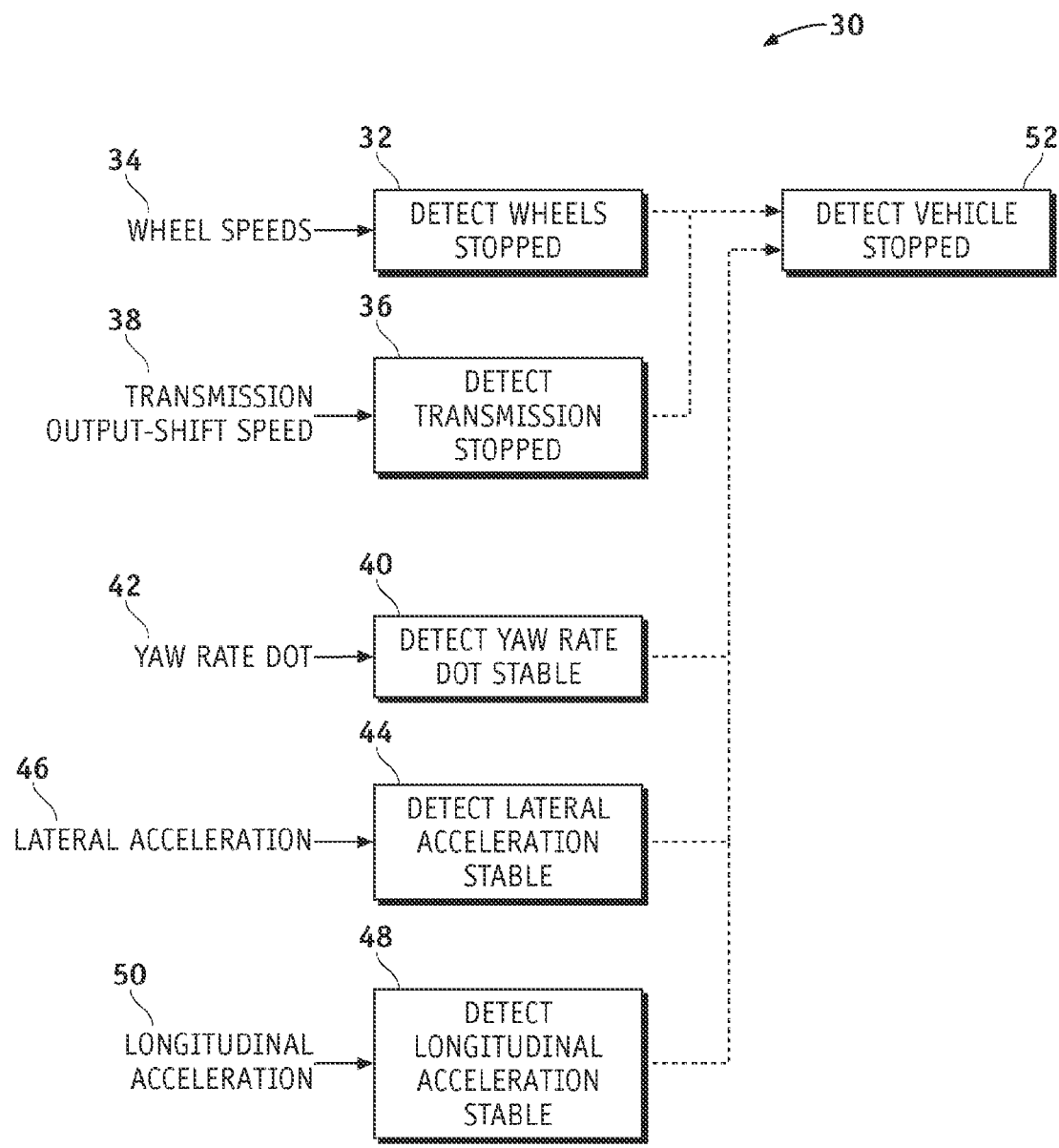
FIG. 2 is an exemplary method for detecting when a vehicle is at rest.

FIG. 2 illustrates a block diagram of an exemplary method 30 for detecting when a vehicle is stopped. Again, method 30 may be implemented by system 10 (FIG. 1). A series of vehicle dynamic operational parameters, which may be obtained by sensors or other means as described in the system 10, are analyzed. Parameters may include wheel speed 34, transmission output speed 38, yaw rate 42, lateral acceleration (Ay) 46, and longitudinal acceleration (Ax) 50.

In the first stage of the exemplary embodiment 30, wheel speeds 34 are compared to a predetermined threshold. For example, the predetermined threshold may be set to be about 0.1 miles per hour (MPH). When a predetermined number of wheels are below this threshold, all wheels are collectively determined to be in at rest.

In the second stage of method 30, the transmission output speed is processed 36, where the transmission output-shaft speed 38 may be checked against a predetermined threshold in a similar manner to the wheel speeds described above. When the transmission output shaft speed is less than this threshold, all wheels connected to the transmission are confirmed to be at rest.

In the third stage of method 30, the rate of change of yaw rate 42 is processed in block 40 to determine whether the rate of change is stable. Use of the term "stable" may refer to a state where no appreciable variation over a period of time is seen in the parameter. In similar fashion, lateral acceleration 46 and longitudinal acceleration 50 are processed through blocks 44 and 48, respectively to determine whether those parameters are similarly stable.

In one embodiment, the determination of the stability of these aforementioned parameters may proceed as follows. Signals representing each of the parameters may be examined individually over the course of a period of time to determine if their values have become substantially level. The terms flat and level may refer to a state where the value does not appreciably change over a period of time. Each signal may be periodically sampled.

The various parameters of the vehicle may be processed into a mathematical algorithm according to $$X = \sum_{1}^{N} (x_n, x_{n+A}, x_{n+B}, x_{n+C}, x_{n+D})/S \tag{1}$$

where X is a rolling average, N is a predetermined number of time intervals, $x_n$ is a first sample of the first parameter, $x_{n+A}$ is a second sample of the first parameter, $x_{n+B}$ is a third sample of the first parameter, $x_{n+C}$ is a fourth sample of the first parameter, $X_{n+D}$ is a fifth sample of the first parameter, and S is a total number of samples obtained.

In one embodiment, the signals may be sampled according to a repeating geometric progression of prime numbers and by then taking a rolling average of the sampled progression. For example, in an exemplary system 10 such as those previously described, the following equation may be implemented according to $$X = \sum_{1}^{71} (x_n, x_{n+3}, x_{n+11}, x_{n+23}, x_{n+43})/5 \tag{2}$$

to generate a rolling average X, where the sum represents intervals from one (1) to seventy one (71). The values $x_n$, $x_{n+3}$, $x_{n+11}$, $x_{n+23}$, $x_{n+43}$ represent the samples n, n+3, n+11, n+23, and n+43. The numbers 1, 3, 11, 23, 43, and 71 are prime numbers.

To better explain the foregoing Equation 1 in an example, the rate of change of the yaw rate signal is sampled over a period of time, represented by intervals 1-71. Not every sample is represented by Equation 1. Only those samples which correspond to the geometric progression of prime numbers such as the first sample, the fourth sample, the twelfth sample, and so on are considered. All five sampled yaw rate values are added together and divided by the number of samples to obtain the rolling average X. As time progresses, each sample are reacquired in geometric order, and a new rolling average X is obtained.

Again, each signal, such as the aforementioned rate of change of the yaw rate signal, the lateral acceleration signal, and the longitudinal acceleration signal, may be sampled and analyzed in a similar fashion. The rolling average of each of these signals, such as $X_{yaw\ dot}$ may be then compared against a current sample (e.g., Y). A difference between the rolling average (e.g., $X_{yaw\ dot}$-Y) may be then compared against a predetermined threshold. If the absolute value of the difference between the rolling average value and the current value is less than the threshold, the vehicle state may then be determined to be stable. Method 30 then proceeds to compare the lateral acceleration signal and longitudinal acceleration in a similar manner. As one skilled in the art will appreciate, variations of the above example methods and analysis may be implemented to suit a particular application.

In block 52, each of the previous determinations that individual dynamic parameters are stopped or stable (e.g., blocks 32, 36, 40, 44, and 48) are considered in their totality. In one embodiment, block 52 determines that the vehicle has reached a resting state if each of the previous determinations have also concluded that the vehicle has stopped. In other words, if the totality of previous determinations indicate that the vehicle has stopped, then block 52 determines that the vehicle has, indeed, stopped.

For example, if the wheel speed and transmission speeds are determined to be about zero, and the vehicle state (given by the analysis of the rate of change of yaw rate, the lateral acceleration, and the longitudinal acceleration) is determined to be stable, again for a predetermined period of time, then block 52 determines that the vehicle has reached a resting state. Again, variations in the consideration of vehicle parameters may be seen in a particular implementation. For example, the predetermined time may vary depending upon vehicle, or certain dynamic parameters may be given more weight than others in a weighted average calculation.

Use of the foregoing techniques provides a novel and effective approach for determining when a vehicle has reached its resting state. The method can address conditions which previous approaches do not take into account, and provide better analysis under real dynamic conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method, comprising:
    determining a wheel speed, a transmission output speed and a vehicle state reflective of a plurality of vehicle dynamic parameters of a vehicle; and
    determining that the vehicle is stopped if, after a predetermined period of time, the wheel speed and transmission output speed each remain substantially equal to zero, and the vehicle state remains stable;
    wherein the plurality of vehicle dynamic parameters includes at least one of a rate of change of a yaw rate, a lateral acceleration, and a longitudinal acceleration parameter;
    wherein determining that the vehicle is stopped further includes processing the plurality of vehicle dynamic parameters to determine if the vehicle state remains stable; and
    wherein processing the plurality of vehicle dynamic parameters further includes processing the plurality of vehicle dynamic parameters according to $$X = \sum_{1}^{N} (x_n, x_{n+A}, x_{n+B}, x_{n+C}, x_{n+D})/S,$$

where X is a rolling average, N is a predetermined number of time intervals, $x_n$ is a first sample of the first parameter, $x_{n+A}$ is a second sample of the first parameter, $x_{n+B}$ is a third sample of the first parameter, $x_{n+C}$ is a fourth sample of the first parameter, $x_{n+D}$ is a fifth sample of the first parameter, and S is a total number of samples obtained.

2. The method of claim 1, wherein processing the plurality of vehicle dynamic parameters further includes obtaining the first, second, third, fourth, and fifth samples according to a progression of prime numbers.

3. The method of claim 1, wherein processing the plurality of vehicle dynamic parameters further includes examining an absolute value of a difference between the rolling average and a current sampled value of the first parameter to determine if the absolute value is less than a threshold value, wherein if the absolute value is less than the threshold value, the vehicle state is determined to be stable.

4. A system for determining whether a vehicle is stopped, comprising:
    a processor having a plurality of sensors configured to receive a plurality of dynamic parameters of a vehicle, the processor configured to determine a wheel speed, transmission output speed and a vehicle state reflective of the plurality of dynamic parameters, and determine that the vehicle is stopped if, after a predetermined period of time, the wheel speed and transmission output speed remain substantially equal to zero and the vehicle state remains stable;
    wherein the plurality of dynamic parameters includes at least one of the wheel speed, the transmission output speed, a rate of change of a yaw rate, a lateral acceleration, and a longitudinal acceleration parameter; and
    wherein the processor is configured to process a first parameter of the plurality of vehicle dynamic parameters according to $$X = \sum_{1}^{N} (x_n, x_{n+A}, x_{n+B}, x_{n+C}, x_{n+D})/S,$$

where X is a rolling average, N is a predetermined number of time intervals, $x_n$ is a first sample of the first parameter, $x_{n+A}$ is a second sample of the first parameter, $x_{n+B}$ is a third sample of the first parameter, $x_{n+C}$ is a fourth sample of the first parameter, $x_{n+D}$ is a fifth sample of the first parameter, and S is a total number of samples obtained.

5. The system of claim 4, wherein the first, second, third, forth, and fifth samples of the first parameter correspond to a progression of prime numbers.

6. The system of claim 4, wherein the processor is configured to examine an absolute value of a difference between the rolling average and a current sampled parameter value if the absolute value is less than a threshold value, wherein if the absolute value is less than the threshold value, the vehicle state is determined to be stable.

7. A computer program product for determining if a vehicle is stopped, the computer program product comprising a computer-readable storage medium having computer-readable program code portions stored therein, the computer-readable program code portions comprising:
    a first executable portion for determining a wheel speed, transmission output speed and a vehicle state representative of a plurality of vehicle dynamic parameters; and
    a second executable portion for determining that the vehicle is stopped if, after a predetermined period of time, the wheel speed and transmission output speed remain substantially equal to zero and the vehicle state remains stable.
    a third executable portion for providing the plurality of vehicle dynamic parameters including the wheel speed and the transmission output speed;
    a fourth executable portion for providing the plurality of vehicle dynamic parameters including a yaw rate, a lateral acceleration, or a longitudinal acceleration parameter;

a fifth executable portion for processing the plurality of vehicle dynamic parameters into an algorithm to determine if the vehicle state remains stable; and a sixth executable portion for processing a first parameter of the plurality of vehicle dynamic parameters into the algorithm according to $$X = \sum_{1}^{N} (x_n, x_{n+A}, x_{n+B}, x_{n+C}, x_{n+D})/S,$$

where X is a rolling average, N is a predetermined number of time intervals, $x_n$ is a first sample of the first parameter, $x_{n+A}$ is an second sample of the first parameter, $x_{n+B}$ is an third sample of the first parameter, $x_{n+C}$ is a fourth sample of the first parameter, $x_{n+D}$ is a fifth sample of the first parameter, and S is a total number of samples obtained.

8. The computer program product of claim 7, wherein the first, second, third, fourth, and fifth samples correspond according to a progression of prime numbers.

9. The computer program product of claim 7, further including a seventh executable portion for examining an absolute value of a difference between the rolling average and a current sampled value to determine if the absolute value is less than a threshold value, wherein if the absolute value is less than the threshold value, the vehicle state is determined to be stable.

* * * * *